G. O. TAGUE.
MACHINE FOR THE AUTOMATIC AND CONTINUOUS MANUFACTURE OF GLASS BOTTLES.
APPLICATION FILED DEC. 4, 1920.
1,373,272.
Patented Mar. 29, 1921.
8 SHEETS—SHEET 1.
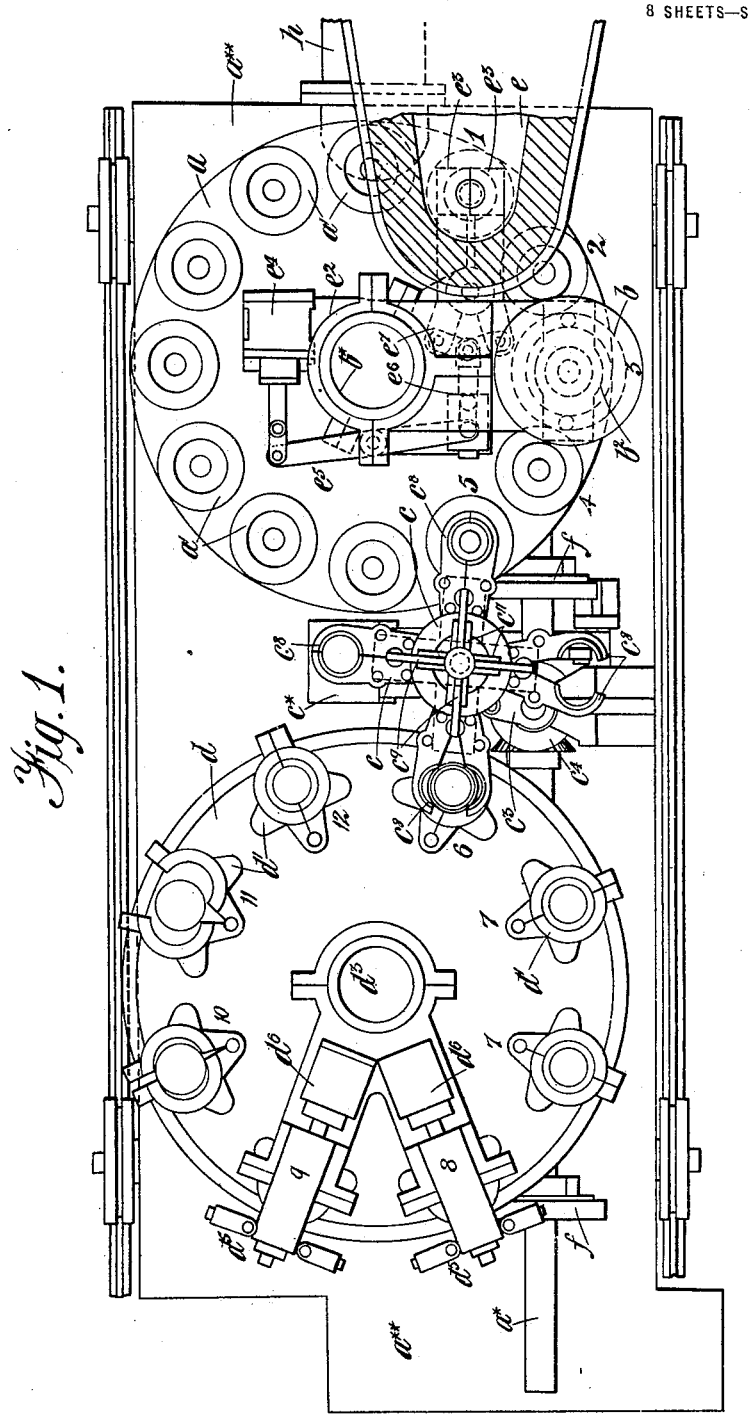

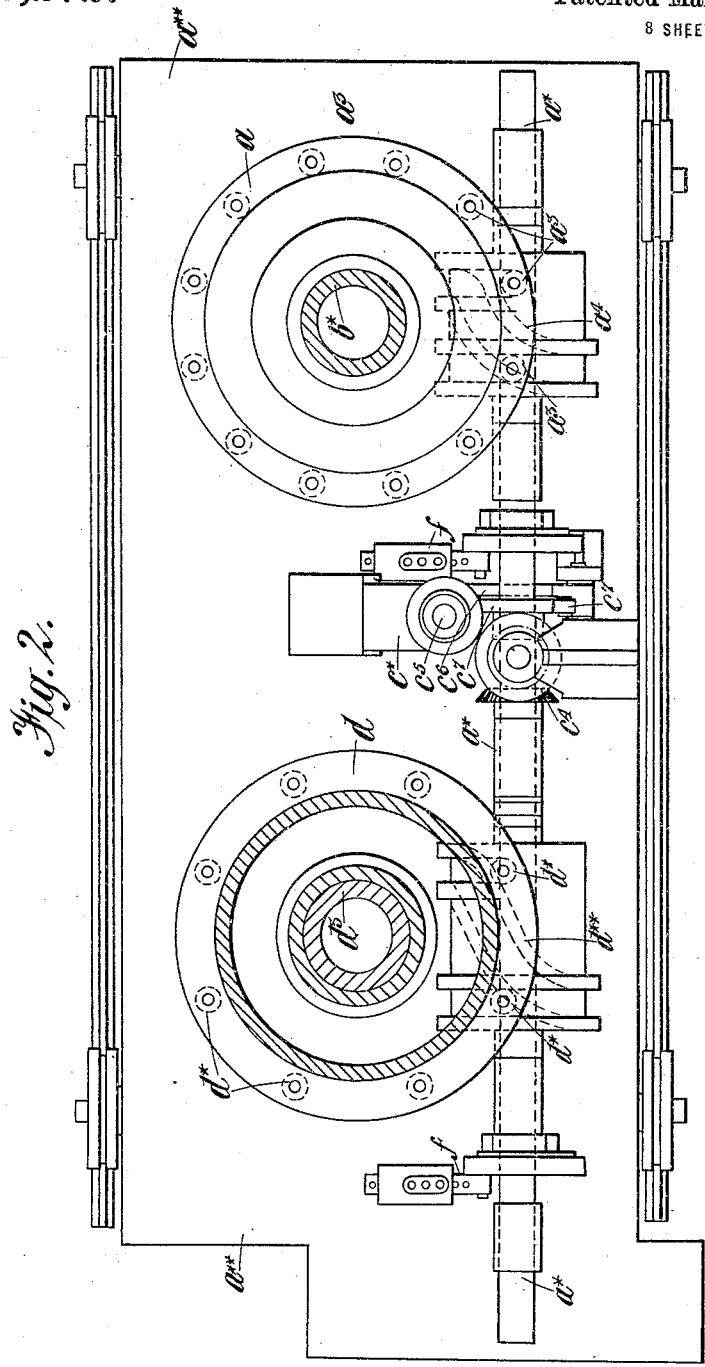

G. O. TAGUE.
MACHINE FOR THE AUTOMATIC AND CONTINUOUS MANUFACTURE OF GLASS BOTTLES.
APPLICATION FILED DEC. 4, 1920.

1,373,272.

Patented Mar. 29, 1921.
8 SHEETS—SHEET 3.

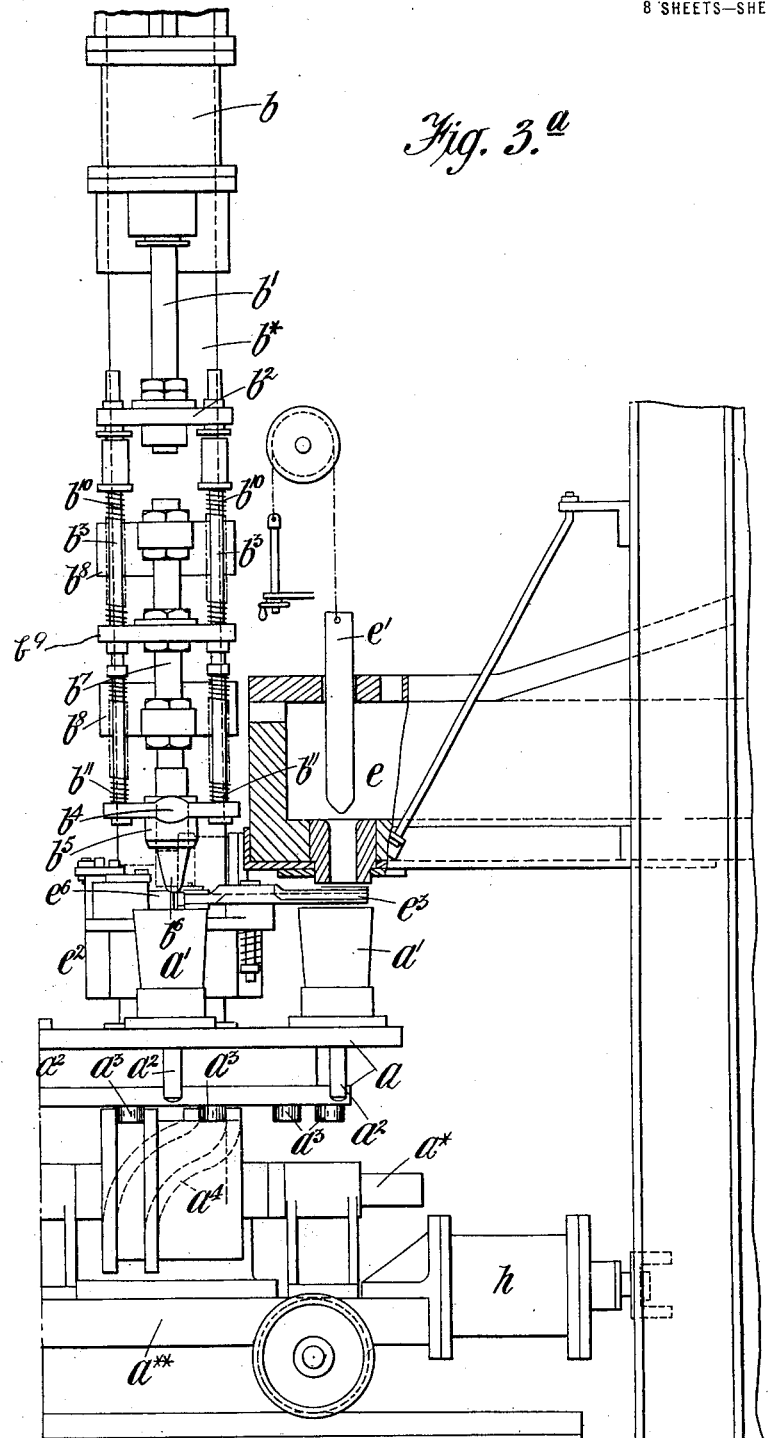

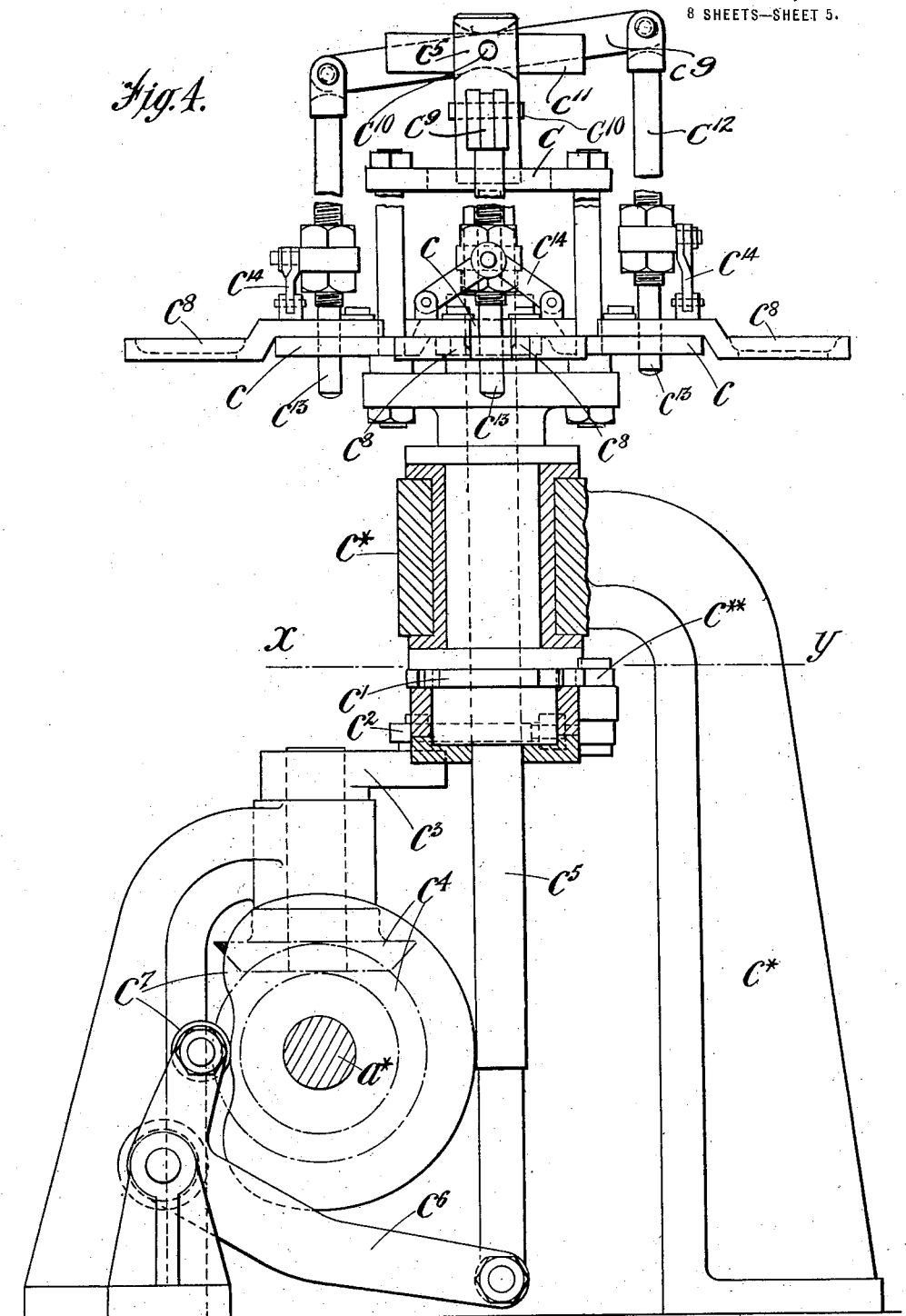

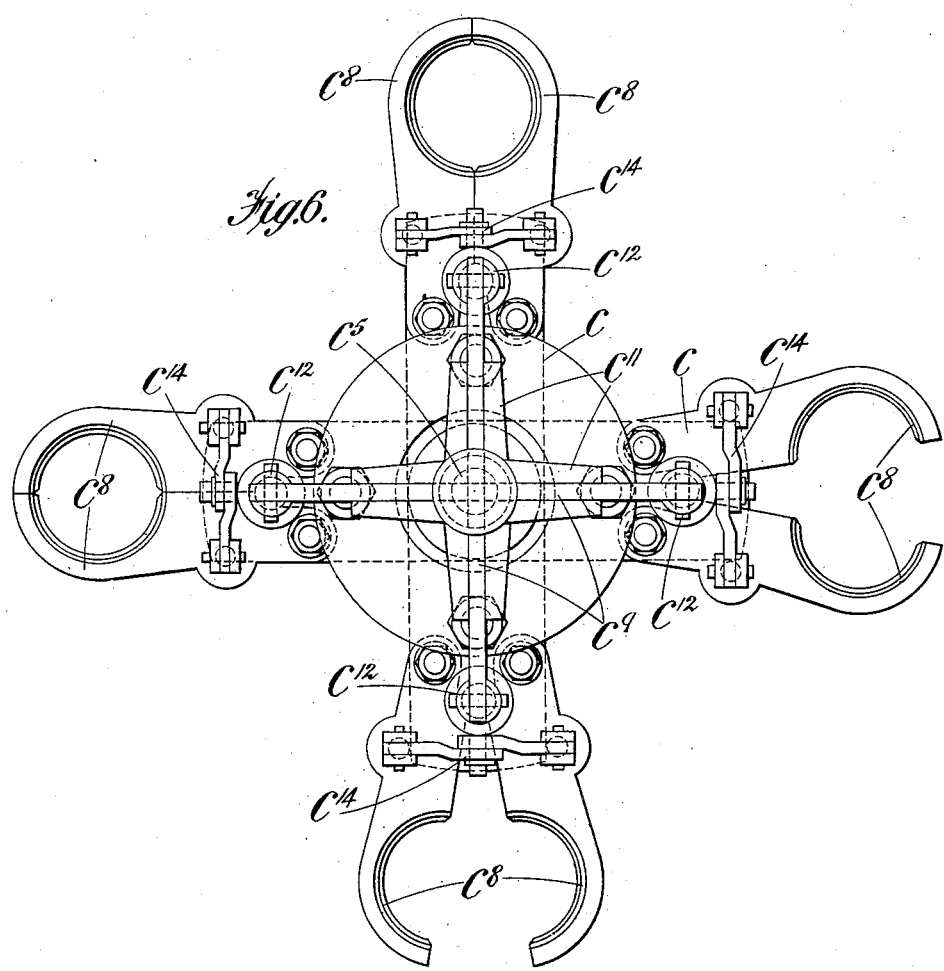

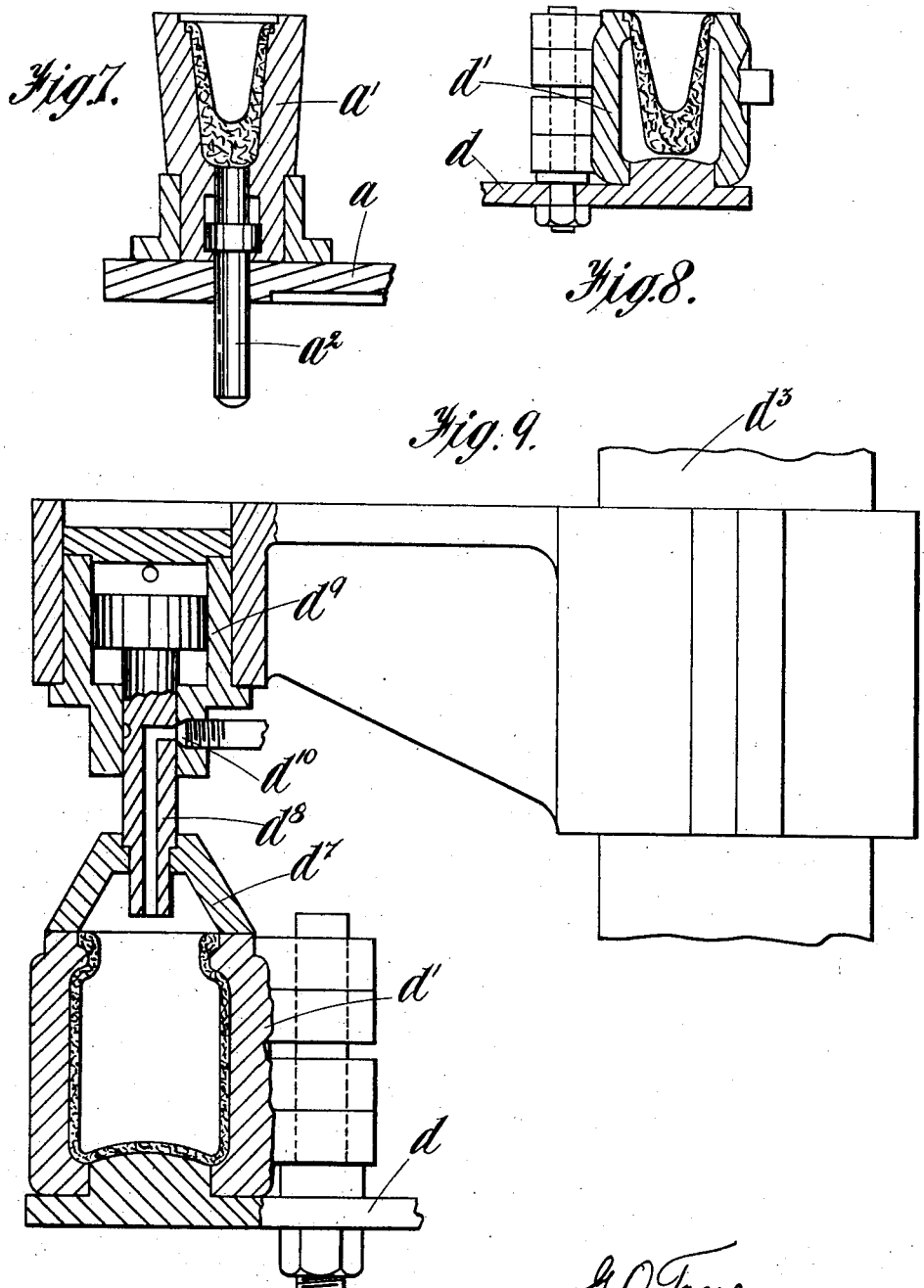

G. O. TAGUE.
MACHINE FOR THE AUTOMATIC AND CONTINUOUS MANUFACTURE OF GLASS BOTTLES.
APPLICATION FILED DEC. 4, 1920.

1,373,272.

Patented Mar. 29, 1921.

UNITED STATES PATENT OFFICE.

GEORGE ORLANDO TAGUE, OF FRINDSBURY, ROCHESTER, ENGLAND.

MACHINE FOR THE AUTOMATIC AND CONTINUOUS MANUFACTURE OF GLASS BOTTLES.

1,373,272. Specification of Letters Patent. Patented Mar. 29, 1921.

Application filed December 4, 1920. Serial No. 428,374.

*To all whom it may concern:*

Be it known that I, GEORGE ORLANDO TAGUE, an American citizen, and a resident of Frindsbury, Rochester, county of Kent, England, have invented a certain new and useful Improvement in Machines for the Automatic and Continuous Manufacture of Glass Bottles, of which the following is a specification.

This invention relates to machinery for the automatic manufacture of glass bottles, that is to say, machinery in which the operations are continuous, step-by-step, in such manner that as molten glass is being poured into one mold a finished bottle is being removed from another mold.

According to the invention, the machine comprises a base having mounted thereon two circular and rotatable tables; the one a receiving table, the other a blowing table, an automatic flow-out and cutting-off device to the receiving table, a pressing device located in proximity to the receiving table, a transferring device located between the receiving and blowing tables to transfer the partly formed bottles from the former to the latter, a blowing device and a pneumatic device to push, when required, the machine, as a whole, away from the molten glass delivery or furnace, and automatically actuated valves for controlling the various air cylinders of the machine.

In order that the invention may be readily understood, reference is to be had to the following description and accompanying sheets of drawings, wherein:—

Figure 1 is a plan view, partly in section, illustrative of the general arrangement of the machine.

Fig. 2 is a plan view, partly in section, illustrative of the driving means for the tables and the transferring device, showing also two air control valves.

Figure 3:
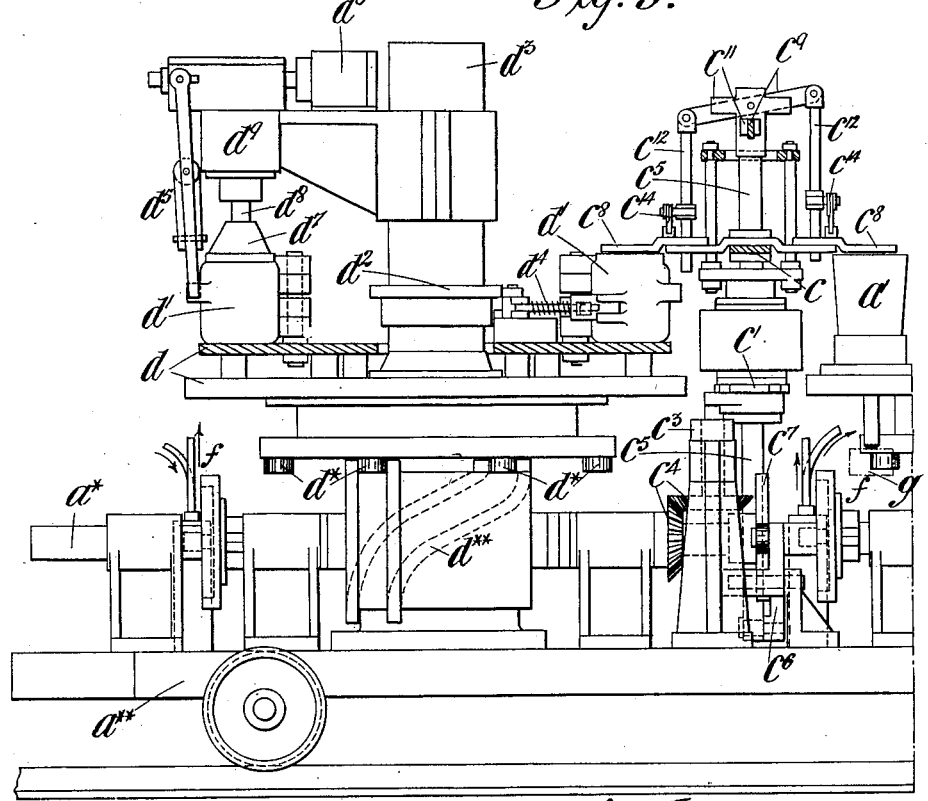

Figs. 3 and 3$^a$ are conjointly a side view, partly in section, illustrative of the general arrangement of the machine.

Fig. 4 is a view, partly in vertical section, of the transferring device.

Figure 5:
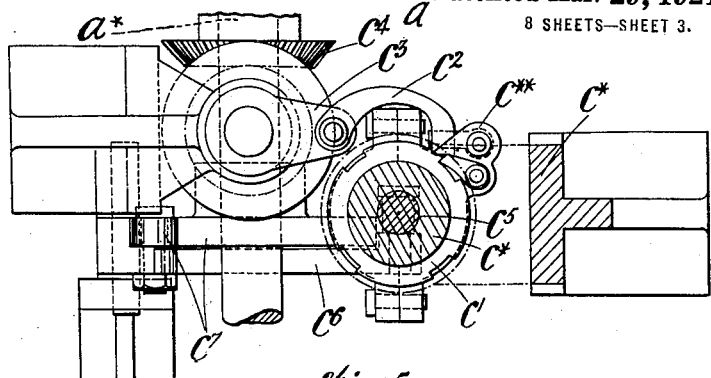

Fig. 5 is a sectional plan view, taken on line $x, y$ of said Fig. 4.

Fig. 6 is a plan view of the transferring arms and gripping jaws.

Fig. 7 is a vertical section through a press or parison mold, after pressing operation.

Fig. 8 is a vertical section through a blow mold, after a transfer operation.

Fig. 9 is a vertical section through a blow mold and a blower, showing bottle fully blown out.

Figure 10:
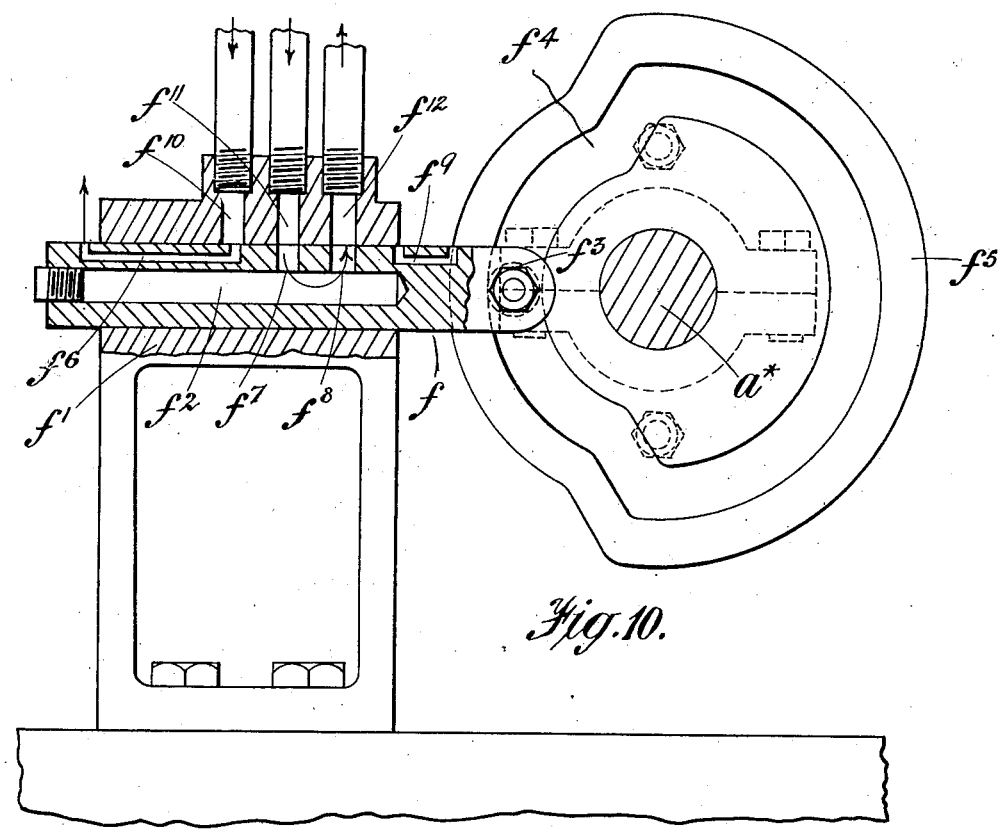

Fig. 10 is a side view, partly in section, illustrative of one of the air control valves.

Figure 11:
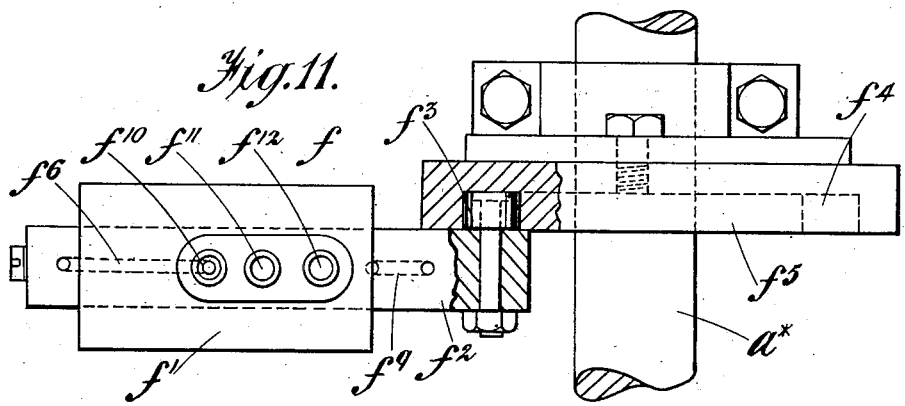

Fig. 11 is a plan view thereof, partly in section.

Like letters of reference indicate corresponding parts in the several figures.

In carrying out the invention, the receiving table $a$, Figs. 1, 2 and 3, which is circular and is rotated through rollers $a^3$ and cam $a^4$ from main shaft $a^*$, is provided with twelve equally spaced apart press or parison molds $a^1$, into the bottom of which take plungers $a^2$.

Molten glass from the furnace is then admitted from the trough $e$, Figs. 1 and 3, which is controlled by plunger $e^1$, to a mold $a^1$ at the position 1, the filling position, and the flow of glass is then automatically cut off. For this purpose, there is mounted on the column $b^*$ of the receiving table $a$, a bracket $e^2$ having pivotally mounted thereon a pair of cutter jaws $e^3$ actuated from air cylinder $e^4$ on said bracket $e^2$, by means of a pivotally mounted lever $e^5$, slide bar $e^6$ and toggles $e^7$, air, under pressure, to said cylinder $e^4$ being by one of the air control valves, designated as a whole by reference letter $f$, hereinafter referred to, said valve being actuated from the main shaft $a^*$.

The table is then turned to position 2, the setting position, and glass allowed to set. The table is then moved to position 3, the pressing position. As these operations take place, other and succeeding molds have been filled with molten glass.

At the pressing position, the pressing device comes into action, and performs the first stage in forming the bottle, *i. e*, roughly pressing out the glass and forming the thickened head and neck of the bottle, Fig. 7. This pressing device consists of a vertically disposed air cylinder $b$, Fig. 3, to whose piston rod $b^1$ is connected a crosshead $b^2$ to which are connected vertically depending rods $b^3$ supporting at their lower ends a suitable mounted crossbar $b^4$ carrying a mold cap $b^5$ through which passes the plunger head $b^6$ of a plunger rod $b^7$ which is carried in a suitably mounted bracket $b^8$. This rod $b^7$ is provided, in its length, with an adjustably disposed crosshead $b^9$ through which, and said bracket $b^8$, the vertically disposed rods $b^3$ pass, said vertical rods $b^3$ being, between the plunger crosshead $b^9$ and the piston crosshead $b^2$, provided with adjustably mounted springs $b^{10}$, adjustably mounted springs $b^{11}$ being also interposed between the mold cap carrying crosshead $b^4$ and the plunger crosshead $b^9$, these latter springs serving to effect an increase or decrease of pressure on the mold cap $b^5$, while the former springs serve to effect an increase or decrease of pressure on the plunger rod $b^7$ and consequently the head $b^6$ thereof.

After pressing, the plunger $b^6$ and mold cap $b^5$ are raised, leaving the partly formed bottle or parison behind in the mold $a^1$, and the table $a$ is then turned to position 4, another setting position, to allow the glass to set. After setting, the table $a$ is again turned to position 5, the transfer position, where the lower end of the plunger $a^2$ of the mold $a^1$, at such position, comes into contact with a stationary surface or bracket, shown diagrammatically in dot-and-dash lines $g$, Fig. 3, which forces said plunger $a^2$ upward and with it the partly formed bottle or parison to above the top of its mold $a^1$, to allow of the bottle neck being engaged by the transferring device, which picks up said parison or partly formed bottle and carries the same to over the blowing table $d$, where it deposits said parison or partly formed bottle in a blow mold $d^1$ thereon.

This transfer device, Figs. 1, 3, 4, 5 and 6, comprises four arms $c$, arranged at right angles to one another, and rotatably mounted on a pedestal $c^*$, said transfer device being moved to time with the turning of the receiving and blowing tables $a$ and $d$ respectively, by means of ratchet plate $c^1$, connecting rod $c^2$, bellcrank $c^3$ and bevel gear $c^4$ driven by main shaft $a^*$. The transfer arms $c$ which are raised and lowered by means of a movable and vertically disposed rod $c^5$, lever $c^6$, roller and cam $c^7$, also driven by main shaft $a^*$, are each provided with a pair of horizontally disposed and pivotally mounted gripping jaws $c^8$ which are opened and closed through the medium of rocker bars $c^9$ pivoted at $c^{10}$ to the crossheads $c^{11}$ of the vertical rod $c^5$, said rocker bars $c^9$, by rods $c^{12}$, whose ends $c^{13}$ extend through the transfer bars $c$, being connected to the toggle links $c^{14}$ of the gripping jaws $c^8$. The arrangement is such that the end $c^{13}$ of the rod $c^{12}$ in proximity to the mold $a^1$ on the receiving table $a$, comes, as the rod $c^5$ completes its down stroke, into contact with a stationary bracket or stop, not shown on the drawings, forcing up said rod $c^{12}$, closing jaws $c^8$ on to the bottle neck.

At the same time the jaws $c^8$ of the opposite transfer arm, at the position 6, transfer position, on the blowing table $d$, open by reason of the lowering of the opposite end of the rocker arm $c^9$, the same, through its rod $c^{12}$, actuating the toggle links $c^{14}$ of the jaws $c^8$ of said opposite transfer bar $c$, allowing the parison or partly formed bottle to drop into the blow mold $d^1$ at such position of the table $d$.

With the above described arrangement of transfer device there obtains one transfer arm down and engaging a parison or partly formed bottle, a second arm raised and holding a parison or partly formed bottle, a third arm down and opened out to deposit a parison or partly formed bottle into a blowing mold, and the fourth arm raised and opened ready to be moved to over the next succeeding parison or partly formed bottle, brought to the transferring position on and by the receiving table.

The blowing table $d$, which is rotated through rollers $d^*$ and cam $d^{**}$ driven from main shaft $a^*$, as shown, is provided with eight equally spaced apart, two-part hingedly connected together blow molds $d^1$ adapted to be automatically opened out or closed through the medium of a cam $d^2$ on the piller $d^3$ of said table $d$, and a suitable arrangement of sliding mechanism, indicated as a whole by reference letter $d^4$, said pillar $d^3$ also carrying duplicated blowing devices.

The parison or partly formed bottle is, when released from its gripping jaws $c^8$, dropped into the blow mold $d^1$ below, where said partly formed bottle or parison is allowed to swing by its neck, as shown in Fig. 8. The table $d$ is then turned, and the partly formed bottle or parison at positions 7, setting position, on said table $d$ re-heats and stretches.

On reaching the position 8, the first blow position, the mold is gripped and held tightly closed by a toggle mechanism, indicated as a whole by reference letter $d^5$, Figs. 1 and 3, actuated by an air cylinder $d^6$ carried by a bracket on the pillar $d^3$ of the table $d$, and at the same time a mold cap $d^7$, Fig. 9, carried by the piston rod $d^8$ of another air cylinder $d^9$ also carried by the before-mentioned bracket, is forced down on to the top of the mold $d^1$, sealing the same.

Air under pressure is now admitted at $d^{10}$, from another air control valve $f$, to the bore of the piston rod $d^8$ and thence into the cavity of the parison or partly formed bottle, blowing the same into its finished form shown in the left hand mold $d^1$ on the table $d$, Fig. 9.

Blowing operation finished, the mold cap $d^7$ is raised, the piston rod $d^8$ in doing so cutting off the air supply to mold, and the toggles $d^5$ released from mold, whereupon the table is turned, bringing the finished bottle to position 9, the partly open position, the bottle, if necessary, being subjected to a second blowing at position 10, the second blow position.

At the partly open position the mold is automatically cracked or partly opened through the medium of the before-mentioned cam $d^2$ and slide mechanism $d^4$, allowing the bottle to free itself from the mold. Table $d$ is then turned to position 11, the open position, where the mold is fully opened by the aforesaid cam and slide mechanism, allowing the finished bottle to be removed, table $d$ being then turned to position 12, the closed position, where the mold is closed in order to retain its heat and be in readiness to receive, at the position 6, the transfer position, another parison or partly formed bottle from the transferring device.

An air cylinder $h$, supported by base $a^{**}$ of the machine, is provided to push the machine, which is mounted on wheels and rails, away from its working position at the furnace when required, and to draw said machine back to its working position.

The air control valves $f$, Figs. 10 and 11, are of the slide valve type, and consist of a base member $f^1$, a hollow slide or plunger $f^2$ slidably mounted therein and a roller $f^3$ carried by said slide, said roller $f^3$ taking in a cam groove $f^4$ of a disk $f^5$ fixedly mounted on the main and driving shaft $a^*$ of the machine. The slide is provided with four passages $f^6$, $f^7$, $f^8$, $f^9$ adapted to register, according to how said slide is moved, with the ports $f^{10}$, $f^{11}$, and $f^{12}$ in the base member $f^2$, one of these ports, the port $f^{11}$, is in communication with the source of air pressure, while the ports $f^{10}$, $f^{12}$ are connected by suitable piping to their respective air cylinder, say, for instance, the air cylinder $e$ of the cutting-off device port $f^{12}$ being connected to the pressing end of said cylinder, while the port $f^{10}$ is connected to the other end and serves as exhaust when pressure is applied to actuate the cutter jaws or shears $e^3$ to cut off the supply of molten glass.

But, on the roller $f^3$ coming into the highest point of the cam groove $f^4$, as the disk $f^5$ is rotated, the valve $f^2$ is shifted, bringing its opening $f^7$ into alinement with the port $f^{10}$, and its opening $f^9$ in alinement with the port $f^{12}$, thus allowing air from the pressing end of the cylinder to exhaust to atmosphere, while putting pressure on the other end of the cylinder by way of port $f^{10}$, thus reversing the movement of the piston of the cylinder $e$ of the cutting-off device, so opening the jaws or shears thereof to allow of a supply of glass to another press or parison mold. In like manner is the other control valve $f$ connected to the cylinders of the blowing device and the same arrangement of air control valve may be applied to the cylinder of the pressing device.

I claim:—

1. In a machine for the manufacture of glassware, the combination with a mold charging and forming device and a separate blowing device, of an intermediate transfer device having article carrying means comprising opposing gripping members movable up and down, and means for actuating the gripping members having an up and down movement independently of the corresponding movement of said gripping members whereby an article carried by one of said first mentioned devices is engaged and an article at the opposite side is simultaneously disengaged for deposit upon the other of said first mentioned devices.

2. A machine for manufacturing glass, substantially as claimed in claim 1, wherein the transfer device comprises a rocking arm coacting with article gripping members adjacent either end, the gripping members adjacent one end being operable upon downward movement of said arm to grip an article while the gripping members adjacent the other end are operable to release an article by upward movement of the other end.

3. A machine for manufacturing glass, substantially as claimed in claim 1, wherein the transfer device comprises crossed rocking arms, each coacting with gripping members adjacent to their respective ends, combined with means for imparting rotary movement to the transfer device and simultaneous opening and closing movement, respectively, to the opposite gripping members of a single arm aforesaid.

4. In a machine for manufacturing glass, the combination with a mold charging and forming device and a separate blowing device, of an intermediate transfer device, comprising a pair of crossed rocking arms pivotally mounted intermediate their ends and gripping members, and actuating means for raising the ends of the arms at one side of the device while lowering the ends of the arms at the other side, said actuating means coacting with the gripping members which are opened and closed as an incident to the rocking of the arms whereby an article may be engaged at the mold charging device while another article may be released synchronously at the blowing device.

5. An automatic transfer device for use in apparatus for manufacturing glassware, comprising a support, an arm pivotally mounted intermediate its length upon said support, actuating means suspended from the ends of said arm whereby the latter may be rocked to raise and lower the respective ends thereof and gripping members with which said actuating means coacts and operable as an incident to the operation of said means for performing their gripping function.

6. A transfer device for apparatus for manufacturing glassware, comprising a support, a pair of rocking arms pivotally mounted upon said support at substantially right angles to each other, an actuating rod suspended from the ends of each arm, a pair of gripping members operable by each of said arms, as an incident to actuation of the respective actuating rods, and link members connecting said gripping members to the actuating rods whereby upon movement of the latter in one direction said gripping members are closed, and upon movement in the other direction said gripping members are opened.

In testimony whereof I have affixed my signature hereto this 8th day of November 1920.

GEORGE ORLANDO TAGUE.